United States Patent [19]
Russell et al.

[11] Patent Number: 5,106,914
[45] Date of Patent: Apr. 21, 1992

[54] PRESSURE SENSITIVE ADHESIVE COMPOSITIONS AND ELEMENTS MADE THEREFROM

[75] Inventors: Gary S. Russell, Chandlers Ford, United Kingdom; John D. Pelesko, Roselle, N.J.

[73] Assignee: ISP Investments Inc., Wilmington, Del.

[21] Appl. No.: 770,977

[22] Filed: Oct. 1, 1991

Related U.S. Application Data

[62] Division of Ser. No. 455,953, Dec. 22, 1989.

[51] Int. Cl.$^5$ ................................ C08F 8/14
[52] U.S. Cl. ................... 525/384; 525/327.7; 525/383
[58] Field of Search ................ 525/383, 384

[56] References Cited

U.S. PATENT DOCUMENTS 3,917,573  11/1975  Parekh et al. .............. 525/384

FOREIGN PATENT DOCUMENTS 2062663  5/1981  United Kingdom .

*Primary Examiner*—Bernard Lipman
*Attorney, Agent, or Firm*—Jules E. Goldberg; Marilyn J. Maue; Joshua J. Ward

[57] ABSTRACT

An adhesive element which exhibits excellent properties with respect to a variety of substrates, such as, skin, glass, fabric, paper, plastic, and other non-porous surfaces which is non-toxic, and non-sensitizing. The element exhibits high cohesive strength so that its integrity is maintained on removal from the substrate leaving no residues and is highly flexible so that total confirmation with the underlying shape of the substrate is maintained. The adhesive composition is the hydrolysis or esterification product of a methylvinyl ether/maleic anhydride co-polymer with an hydroxylated compound. Methods for preparation of the inventive adhesive element are disclosed.

8 Claims, No Drawings

PRESSURE SENSITIVE ADHESIVE COMPOSITIONS AND ELEMENTS MADE THEREFROM

This is a division of application Ser. No. 07/455,953, filed Dec. 22, 1989.

BACKGROUND OF THE INVENTION

I. Field of the Invention

This invention relates to adhesive compositions and methods for manufacture thereof, which compositions are easily formable to shape and are suitable for use in surgical, medical, and industrial applications.

II. Description of the Prior Art

Various adhesive compositions which are suitable for medical use and in particular, adapted to be used for ostomy appliances are disclosed in the patent literature. (See U.S. Pat. No. 4,393,080.) Generally, such compositions require resistance to erosion by moisture or other biological fluids, must exhibit good adherence to the human skin, and also must not be irritating. In addition, it is desired to have adhesive compositions for various industrial and medical applications, which are easily shaped so as to conform to the contours of the surface to which they are being applied and yet are simple to prepare.

Attempts to formulate such compositions utilizing mixtures of various polymers and hydroxyl-containing compounds, such as, Gantrez (a product of GAF Chemical Corporation composed of a co-polymer of methylvinyl ether and maleic anhydride), polyethylene oxide, ethoxylated alkyl phenol or nonyl phenol, e.g., Igepal, polyethylene oxide (GAF Chemical) are known. (See Japanese Patent 8805757, German Patent 3039542, and German Patent 2311746.) However, improvements in such adhesive elements are in constant demand, particularly, with respect to exhibiting the concomitant properties of good adhesion to the surface, ability to conform to the surface and yet absence of irritation in medical applications.

SUMMARY OF THE INVENTION

We have discovered an adhesive element which exhibits highly desirable properties with respect to the above-outlined requirements. In particular, we have discovered a method for making such an adhesive element by hydrolysing or esterifying a co-polymer of polymethylvinyl ether and maleic anhydride having the formula:

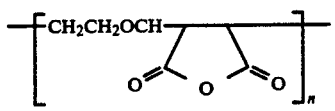

wherein n is such that the weight average molecular weight is from about $2 \times 10^5$ to $2.4 \times 10^6$ to form a smooth paste. The paste may then be formed into the desired shape and heated for a period of time and temperature sufficient to form a gel. Upon cooling, a formed adhesive mass or element is obtained in the particular desired shape which is suitable for use in medicinal as well as other end uses.

DETAILED DESCRIPTION OF THE INVENTION

More particularly, we have discovered a variety of adhesive masses or elements which may be useful in many different medical devices and can be easily formed into desired shapes by reacting slurries of a first component comprising the methylvinyl ether/maleic anhydride co-polymer with a second component comprising an hydroxylated compound to hydrolyse or esterify the co-polymer.

Typically, the hydrolysis product would be the diacid whereas the esterification product may be the partial or full ester according to the following sequence:

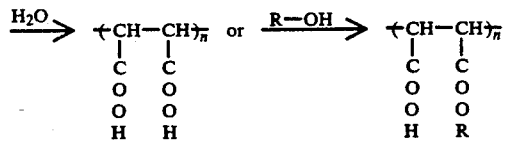

wherein R may be a wide variety of organic groups, e.g., alkyl polyethoxylates, aromatics, and fused aromatics, since the most important characteristic of the R-OH compounds is the hydroxyl group.

Depending upon the particular hydrolysing or esterification compounds used, the masses or elements may have varying degrees of tack, shear, and peel strength. Moreover, in a preferred embodiment, the masses can be formed within a container, which allows shaping of the element, which also provides packaging for the adhesive until its use.

Preferably, the methylvinyl ether/maleic anhydride co-polymer first component which is suitable for use in the present invention includes polymers wherein n is such that the weight average molecular weight is in the range from about $1.25 \times 10^6$ to $2.4 \times 10^6$ and most preferably, from about $1.08 \times 10^6$ to $1.98 \times 10^6$. A wide variety of such co-polymers are marketed under the trademark Gantrez (GAF Chemical Corporation).

The preferred materials for the first component are the long chain methylvinyl ether/maleic anhydride co-polymers wherein the maleic anhydride moiety in the polymer is intact, e.g., Gantrez S-97, and Gantrez AN-169.

The second component used to form the composition is an hydroxylated compound which serves to hydrolyse or esterify the polymer. Typical of such hydroxylated compounds are polyethoxylated fatty alcohols, oleyl alcohols, nonyl phenols, and octyl phenols. Others include polyethoxylated fatty alcohols, nonyl phenols, octyl phenols, polyethylene glycol, 1,3-butane diol, 1,4-butane diol, propylene glycol, 1,3-propane diol, and ethylene glycol.

The amount of the first component reactant used for the reaction is in the range from about 5 to 50 weight %. Preferred is from about 10 to 40 weight %, and most preferred is from about 15 to 35 weight %; all percentages being based on the total weight of the reactants.

The amount of hydroxylated compound used for the reaction in the present invention is in the range from about 5 to 50 weight % and preferably, from about 10 to 35 weight %, and most preferably, from about 15 to 30 weight % based on the total weight of the composition.

In addition, the composition may employ various additives, e.g., humectants, fillers, and the like.

Humectants are particularly useful since they serve to prevent the finally prepared element from drying out. Such humectants include non-ionic surfactants as well as certain compounds within the class of hydroxylated compounds which are useful to the second component, e.g., glycerol and polyethylene glycol. Thus, in this case, the second component may act as both a reactant and humectant.

The amount of humectant generally is in the range from about 5 to 50 weight %, preferably from about 15 to 35 weight %, and most preferably, from about 20 to 25 weight %, all weight percents being based on the total weight of the composition. Generally, the remainder of the reaction mixture is water.

The manner in which the inventive composition may be prepared is particularly advantageous. Generally, the methylvinyl ether/maleic anhydride co-polymer first component and hydroxylated compound second component, and water are reacted by admixing with stirring and heating to form a smooth paste. This reaction is generally carried out at a temperature from about 25° to 95° C. In a preferred embodiment, the hydroxylated compound, first component humectant (if used, and if different from the hydroxylated compound) are first mixed together with water. The mixture is warmed to a temperature in the range from about 25° to 70° C., preferably, from about 50° to 70° C., and, most preferably, about 60° C., and then the methylvinyl ether/maleic anhydride copolymer first component is added with stirring. Normally, this admixing is carried out slowly, i.e., over a period of from about 15 to 20 minutes to ensure uniformity of the mixture and to form a smooth paste.

After the addition of the first component, the reaction mass is heated at a temperature and for a time period sufficient to effect completion of the reaction which it is generally evidenced by the formation of a cohesive, adhesive element. Generally the reaction is carried out at a temperature from about 70° to 95° C., preferably, from about 85° to 95° C., and most preferably, from about 90° to 95° C., for about 0.5 to 6 hours, preferably, from about 1 to 2 hours, and most preferably, for one hour. This heating should be carried out so as to assure a uniform temperature throughout the reaction mixture and avoid localized heating. Advantageously, the paste is placed in a mold having the desired shape of the element and the reaction is carried out in the mold thus producing a finished adhesive element having the desired shape.

Preferably, the inventive adhesive mass is formed by mixing the reactants (paste) in a flexible bag or container of a plastic film, e.g., polyethylene. The advantage is that the reaction may be formulated within the bag or enclosure, and then shaped while in the bag. The reactants in the shaped bag may be subjected to the reaction conditions and, upon cooling, the element is ready for use by removal from the bag at the time of use. Consequently, in essentially a series of simple steps, the adhesive can be formulated in a manner which allows it to be stored in its own packaging and one need only remove the mass from the packaging at the time of use.

EXAMPLES

The following are the chemical names of the trademark products used in the Examples:

Gantrez AN-119: a co-polymer of methylvinyl ether and maleic anhydride with a molecular weight of 200,000

Gantrez AN-139: a co-polymer of methylvinyl ether and maleic anhydride with a molecular weight of 1,000,000

Gantrez AN-169: a co-polymer of methylvinyl ether and maleic anhydride with a molecular weight of 2,000,000

Antarox DM-970: dialkylnonyl phenol ethoxylate

Pegol F-68: propylene oxide/ethylene oxide co-polymer with a ratio of 80/20

Pegol L-61: propylene oxide/ethylene oxide co-polymer with a ratio of 90/10

Emulphor ON-870: oleyl alcohol polyoxyethylated with 20 mols/mole of ethylene oxide Gafac LO-529: phosphate ester of ethoxylated nonylphenol Pegol 400: polyethylene glycol with a molecular weight of 400

Pegol 1450: polyethylene glycol with a molecular weight of 1450

Pegol 4000: polyethylene glycol with a molecular weight of 4000

Dextrin 30 AN 45: degraded starch

Igepal CO-210: ethoxylated nonylphenol with a molecular weight of 286

Igepal CO-520: ethoxylated nonylphenol with a molecular weight of 440

Igepal CO-610: ethoxylated nonylphenol with a molecular weight of 528–572

Igepal CO-630: ethoxylated nonylphenol with a molecular weight of 616

Igepal CO-720: ethoxylated nonylphenol with a molecular weight of 748

Igepal CO-880: ethoxylated nonylphenol with a molecular weight of 1540

Igepal CO-990: ethoxylated nonylphenol with a molecular weight of 4620

Igepal CA-630: ethoxylated nonylphenol with a molecular weight of 621

The following example illustrates the invention:

A variety of samples were obtained by using different amounts of water, glycerol, surfactant, and methylvinyl ether/maleic anhydride co-polymer. The indicated amount of water, glycerol, and surfactant were introduced to a glass beaker which was heated in a water bath to 60° C. with stirring. The methylvinyl ether/maleic anhydride copolymer was added to this mixture with stirring. After a smooth paste was formed, the mixture was placed in a polyethylene 5"×8" freezer bag (polyethylene thickness of 35–40 micrometers).

The bag was flattened lightly between two glass plates secured with elastic bands, the bag was sealed and immersed in a water bath at a temperature of about 90° to 95° C. for at least one hour. After heating, the bag was removed and cooled with tap water. The mass was sampled by cutting a strip from the edge and then removing one or both sides of the attached polyethylene film to provide the adhesive test piece.

Adhesion to various surfaces was tested by applying a 1/16 inch mass formed by the above-outlined procedure to skin, glass, paper, gauze dressing, applying slight finger pressure to attach and then attempting to remove the mass as indicated.

Values assigned, i.e., good, fair poor, where judged as follows:

good—masses remain adhered to the substrate and can only be removed by peeling from said substrate by applying some force fair—same procedure but mass easily removed with little applied force poor—same procedure but mass peels from substrate with little or no applied peeling force (literally falls off the substrate of its own weight).

Table I shows the compositions of 6 different formulations produced by the above-outlined method. Table II shows the properties of each of these formulations.

As can be seen from the following examples, depending on the relative amounts and specific compounds or reactants used within the scope of the classes of components described herein in accordance with the invention, a wide variety of tack and adhesive properties can be obtained which allows the element to be tailored for a particular end use.

TABLE I

INITIAL TRIAL FORMULATIONS

| Raw Sample Material | 1 | 2 | 3 | 4 | 5 | 6 |
| --- | --- | --- | --- | --- | --- | --- |
| Gantrez AN-119 | 25 | — | — | — | — | — |
| Gantrez AN-169 | — | 25 | 20 | 20 | 25 | 25 |
| Glycerol | — | 5 | 20 | 20 | 25 | 25 |
| Pegol F-68 | — | 25 | — | 20 | 25 | — |
| Igepal CO-720 | 25 | — | — | — | — | — |
| Igepal DM-970 | — | — | — | — | — | 25 |
| Water | 30 | 35 | — | — | 25 | 25 |

TABLE II

| Formulation | Adhesion to skin Initial | Adhesion to skin After 4 hours | Adhesion to glass | Adhesion to paper | Adhesion to dressing | Skin-removal properties | Skin-reseal properties |
| --- | --- | --- | --- | --- | --- | --- | --- |
| 1 | good | good | — | — | — | — | — |
| 2 | fair | poor | — | — | — | — | — |
| 3 | poor | poor | — | — | — | — | — |
| 4 | poor | poor | — | — | — | — | — |
| 5 | fair | poor | — | — | — | — | — |
| 6 | good | good | — | — | — | — | — |

These formulations were repeated at a later date when the successful formulations produced equally satisfactory results Tables III and IV show the compositions and properties of a variety of samples prepared using additional hydroxyl-containing polymers and compounds.

TABLE III

ALTERNATIVE HYDROXYL COMPOUNDS
A trial series was next made to investigate the suitability of other —OH containing polymers and compounds.

| Raw Sample Material | 7 | 8 | 9 | 10 | 11 | 12 | 13 | 14 |
| --- | --- | --- | --- | --- | --- | --- | --- | --- |
| Gantrez AN-169 | 25 | 25 | 25 | 25 | 25 | 25 | 25 | 25 |
| Water | 25 | 25 | 25 | 17 | 34 | 34 | 25 | 34 |
| Glycerol | 25 | 25 | 25 | 25 | 25 | — | — | — |
| Igepal CO-210 | 25 | — | — | — | — | — | — | — |
| Igepal CO-610 | — | 25 | — | — | — | — | — | — |
| Pegol L-61 | — | — | 25 | — | — | — | — | — |
| Pegol 1450 | — | — | — | — | — | 25 | — | — |
| Dextrin 30 AN 45 | — | — | — | — | — | — | — | 25 |

TABLE IV

| Formulation | Adhesion to skin Initial | Adhesion to skin After 4 hours | Adhesion to glass | Adhesion to paper | Adhesion to dressing | Skin-removal properties | Skin-reseal properties |
| --- | --- | --- | --- | --- | --- | --- | --- |
| 7 | fair | fair | good | — | — | easy | — |
| 8 | good | good | good | good | good | — | — |
| 9 | fair | fair | good | — | — | — | — |
| 10 | poor | poor | — | — | — | — | — |
| 11 | good | good | good | good | good | fair | — |
| 12 | good | good | good | — | — | — | — |
| 13 | poor | poor | — | — | — | — | — |
| 14 | good | good | good | — | — | poor | poor |

Tables V and VI show yet a further variety of samples in accordance with the present invention and the properties thereof.

TABLE V

| Ingredients | 15 | 16 | 17 | 18 | 19 | 20 | 21 | 22 | 23 | 24 | 25 | 26 | 27 | 28 | 29 | 30 | 31 |
| --- | --- | --- | --- | --- | --- | --- | --- | --- | --- | --- | --- | --- | --- | --- | --- | --- | --- |
| Gantrez AN-169 | 25 | 25 | 25 | 25 | 25 | 25 | 25 | 25 | 25 | 25 | 25 | 25 | 25 | 25 | 25 | 25 | 5 |
| Gantrez AN-139 | — | — | — | — | — | — | — | — | — | — | — | — | — | — | — | — | — |
| Gantrez AN-119 | — | — | — | — | — | — | — | — | — | — | — | — | — | — | — | — | — |
| Glycerol | 25 | 25 | 25 | 25 | 25 | 25 | 25 | 25 | 25 | 25 | 25 | 25 | 25 | 25 | 50 | 25 | 10 |
| Water | 25 | 25 | 25 | 25 | 25 | 25 | 25 | 25 | 25 | 25 | 25 | 25 | 25 | 25 | 25 | 25 | 10 |
| Igepal CO-210 | — | 25 | — | — | — | — | — | — | — | — | — | — | — | — | — | — | — |
| Igepal CO-520 | — | — | 25 | — | — | — | — | — | — | — | — | — | — | — | — | — | — |
| Igepal CO-630 | — | — | — | 25 | — | — | — | — | — | — | — | — | — | — | — | — | 15 |
| Igepal CO-880 | — | — | — | — | 25 | — | — | — | — | — | — | — | — | — | — | — | — |
| Igepal CO-990 | — | — | — | — | — | 25 | — | — | — | — | — | — | — | — | — | — | — |
| Igepal CA-630 | — | — | — | — | — | — | 25 | — | — | — | — | — | — | — | — | — | — |
| Emulphor ON-870 | — | — | — | — | — | — | — | 25 | — | — | — | — | — | — | — | — | — |
| Gafac LO-529 | — | — | — | — | — | — | — | — | 25 | — | — | — | — | — | — | — | — |

TABLE V-continued

| Ingredients | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|
| Pegol 400 | — | — | — | — | — | — | — | — | — | — | — | — | 25 | — | — | — | — |
| Pegol 1450 | — | — | — | — | — | — | — | — | — | — | — | 25 | — | — | — | — | — |
| Pegol 4000 | — | — | — | — | — | — | — | — | — | — | 25 | — | — | — | — | — | — |
| Dextrin 30 AN 45 | — | — | — | — | — | — | — | — | — | — | — | — | — | 25 | — | — | — |
| Sugar | — | — | — | — | — | — | — | — | — | — | — | — | — | — | 25 | — | — |
| Propyleneglycol | — | — | — | — | — | — | — | — | — | — | — | — | — | — | — | 25 | — |
| Pegol F-68 | 25 | — | — | — | — | — | — | — | — | — | — | — | — | — | — | — | — |
| Formulation | 15 | 16 | 17 | 18 | 19 | 20 | 21 | 22 | 23 | 24 | 25 | 26 | 27 | 28 | 29 | 30 | 31 |

| Ingredients | 32 | 33 | 34 | 35 | 36 | 37 | 38 | 39 | 40 | 41 | 42 | 43 | 44 |
|---|---|---|---|---|---|---|---|---|---|---|---|---|---|
| Gantrez AN-169 | 6.6 | 13.3 | 15 | 5 | 6.6 | 13.3 | 15 | 15 | 15 | — | — | — | — |
| Gantrez AN-139 | — | — | — | — | — | — | — | — | — | — | — | 25 | 25 |
| Gantrez AN-119 | — | — | — | — | — | — | — | — | — | 25 | 25 | — | — |
| Glycerol | 10 | 10 | 10 | 10 | 10 | 10 | 10 | — | — | 25 | 25 | 25 | 25 |
| Water | 10 | 10 | 10 | 10 | 10 | 10 | 10 | 12.5 | 20 | 25 | 25 | 25 | 25 |
| Igepal CO-210 | — | — | — | — | — | — | — | — | — | — | — | — | — |
| Igepal CO-520 | — | — | — | — | — | — | — | — | — | — | — | — | — |
| Igepal CO-630 | 13.3 | 6.6 | 5 | — | — | — | — | 15 | — | — | — | — | — |
| Igepal CO-880 | — | — | — | — | — | — | — | — | — | — | — | — | — |
| Igepal CO-990 | — | — | — | — | — | — | — | — | — | — | — | — | — |
| Igepal CA-630 | — | — | — | — | — | — | — | — | — | — | — | — | — |
| Emulphor ON-870 | — | — | — | — | — | — | — | — | — | — | — | — | — |
| Gafac LO-529 | — | — | — | — | — | — | — | — | — | — | — | — | — |
| Pegol 400 | — | — | — | — | — | — | — | — | — | — | — | — | — |
| Pegol 1450 | — | — | — | — | — | — | — | — | — | — | — | — | — |
| Pegol 4000 | — | — | — | — | — | — | — | — | — | — | — | — | — |
| Dextrin 30 AN 45 | — | — | — | 15 | 13.3 | 6.6 | 5 | — | 15 | — | 25 | — | 25 |
| Sugar | — | — | — | — | — | — | — | — | — | — | — | — | — |
| Propyleneglycol | — | — | — | — | — | — | — | — | — | — | — | — | — |
| Pegol F-68 | — | — | — | — | — | — | — | — | — | 25 | — | 25 | — |
| Formulation | 32 | 33 | 34 | 35 | 36 | 37 | 38 | 39 | 40 | 41 | 42 | 43 | 44 |

TABLE VI

PROPERTIES

| Formulation | Adhesion to skin Initial | Adhesion to skin After 4 hours | Adhesion to glass | Adhesion to paper | Adhesion to dressing | Skin-removal properties | Skin-reseal properties |
|---|---|---|---|---|---|---|---|
| 15 | Poor falls off | None | Good | Good | Poor | Easy | Poor |
| 16 | Poor falls off | None | Good | Poor | Poor | Easy | None |
| 17 | Good | Good | Good | Good | Good | Difficult, pulls hairs | Excellent |
| 18 | Good | Good | Good | Good | Good | Difficult, pulls hairs | Excellent |
| 19 | Poor | None | Good | Good | Good | Easy | Good |
| 20 | Poor | None | Fair | Fair | Poor | Easy | Poor |
| 21 | Good | Good | Good | Good | Good | Difficult, | Good |
| 22 | None | — | None | None | None | — | — |
| 23 | Poor | None | Good | Good | Good | Easy | Good |
| 24 | Poor | None | Fair | Good | Fair | Easy | Fair |
| 25 | Poor | None | Good | Good | Good | Easy | Good |
| 26 | Fair | None | Good | Good | Poor | Easy | Poor |
| 27 | Good | None | Good | Good | Good | Fell off | Good |
| 28 | Good | None | Good | Good | Good | Easy | Good |
| 29 | Good | Good | Good | Good | Good | Firm/Easy | Good |
| 30 | Good | Good | Good | Good | Good | Firm/Easy | Good |
| 31 | Not compatible, exudate present on surface. | | | | | | |
| 32 | Good | Good | Good | Good | Good | Strong, pulls hairs | Good remove |
| 33 | Good | None | Good | Good | Good | Fell off | Good |
| 34 | Not practical formulation, too thick. | | | | | | |
| 35 | Good | Good | Good | Good | Good | Easy, but strong bond | Good |
| 36 | Good | None | Good | Good | Good | Easy, but strong bond | Good |
| 37 | Good | None | Good | Good | Fair | Fell off | Good |
| 38 | Good | None | Good | Good | Good | Fell off | Good |
| 39 | Good; adhesion too high; not possible to remove from polyethylene! | | | | | | |
| 40 | Good | Good | Good | Good | Good | Strong but easy | Good |
| 41 | Good | Good | Good | Good | Good | Strong but easy | Good |
| 42 | Good | Good | Good | Good | Good | Strong but easy | Good but peels |
| 43 | Good | None | Good | Good | Good | Easy | Good |
| 44 | Good | Fair | Good | Good | Good | Easy | Good |

What is claimed is:

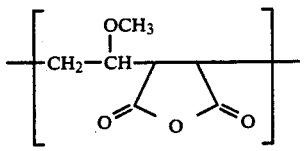

wherein n is such that the average molecular weight of the copolymer is from about $2 \times 10^5$ to $2.4 \times 10^6$, with a second component selected from the group consisting of polyethoxylated fatty alcohols, nonyl phenols, octyl phenols, polyethylene glycol, 1,3-butane diol, 1,4-butane diol, propylene glycol, 1,3-propane diol, and ethylene glycol, wherein the amount of the first component is in the range from about 5 to 50 weight % and the amount of the second component is from about 5 to 50 weight %, based on the total weight of the composition, in the presence of water and reacting the mixture at a temperature and time period sufficient to hydrolyze or esterify the first component.

2. The method of claim 1 wherein the adhesive composition further comprises a humectant, which humectant is a compound other than the second component.

3. The method of claim 1 wherein the average molecular weight of the co-polymer is from about $1.25 \times 10^6$ to $2.4 \times 10^6$.

4. The method of claim 1 wherein the average weight of the co-polymer in the composition is from about $1.08 \times 10^6$ to $1.98 \times 10^6$.

5. A method for forming a composition by mixing a first component selected from the group consisting of polyethoxylated fatty alcohols, nonyl phenols, octyl phenols, polyethylene glycol, 1,3-butane diol, 1,4-butane diol, propylene glycol, 1,3-propane diol, and ethylene glycol, with water and maintaining said mixture at a temperature from about 25° to 70° C., adding a second component of a copolymer having the formula:

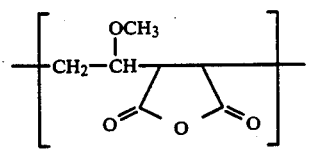

wherein n is such that the average molecular weight of the copolymer is from about $2 \times 10^5$ to $2.4 \times 10^6$, to this mixture so as to form a uniform paste and heating the paste at a temperature of from about 70° to 95° C. in a mold having the desired shape of the ultimate element.

6. The method of claim 5 wherein the adhesive composition further comprises a humectant, which humectant is a compound other than the first component.

7. The method of claim 5 wherein the average molecular weight of the co-polymer is from about $1.25 \times 10^6$ to $2.4 \times 10^6$.

8. The method of claim 5 wherein the average weight of the co-polymer in the composition is from about $1.08 \times 10^6$ to $1.98 \times 10^6$.

* * * * *